United States Patent
Teller et al.

(10) Patent No.: US 9,369,680 B2
(45) Date of Patent: Jun. 14, 2016

(54) PROTECTING ROADSIDE PERSONNEL USING A CAMERA AND A PROJECTION SYSTEM

(71) Applicants: Seth Teller, Cambridge, MA (US); Berthold K. P. Horn, Chatham, NH (US)

(72) Inventors: Seth Teller, Cambridge, MA (US); Berthold K. P. Horn, Chatham, NH (US)

( * ) Notice: Subject to any disclaimer, the term of this patent is extended or adjusted under 35 U.S.C. 154(b) by 139 days.

(21) Appl. No.: 14/288,914

(22) Filed: May 28, 2014

(65) Prior Publication Data

US 2015/0348388 A1    Dec. 3, 2015

(51) Int. Cl.
| | |
|---|---|
| *G08B 21/00* | (2006.01) |
| *H04N 7/18* | (2006.01) |
| *G06K 9/00* | (2006.01) |
| *B60Q 1/26* | (2006.01) |
| *B60Q 1/52* | (2006.01) |
| *E01F 15/00* | (2006.01) |
| *G03B 21/00* | (2006.01) |

(52) U.S. Cl.
CPC ............. *H04N 7/185* (2013.01); *B60Q 1/2611* (2013.01); *B60Q 1/52* (2013.01); *E01F 15/00* (2013.01); *G03B 21/00* (2013.01); *G06K 9/00671* (2013.01); *B60Q 2400/50* (2013.01)

(58) Field of Classification Search
CPC .................................................. G08B 21/0202
USPC .............................. 340/937, 815.45; 362/157
See application file for complete search history.

(56) References Cited

U.S. PATENT DOCUMENTS

| | | | |
|---|---|---|---|
| 7,182,479 B1 * | 2/2007 | Flood et al. .................... | 362/194 |
| 2009/0207038 A1 * | 8/2009 | Gallo ........................ | 340/815.45 |

OTHER PUBLICATIONS

The bike lane that travels with you (internet article) by:Jude Garvey Jun. 26, 2009.
Xfire system projects a bike lane onto the road (internet article) by: Ben Coxworth Sep. 25, 2012.
Laser-projecting Bicycle light takes to Kickstarter for crowdfunding (internet article) by: James Holloway Nov. 29, 2012.
Lumigrids—the LED projector that keeps cyclists out of potholes (internet article) by: Chris Wood May 28, 2013.

* cited by examiner

*Primary Examiner* — Jeffery Hofsass
(74) *Attorney, Agent, or Firm* — Graham Curtin, P.A.

(57) ABSTRACT

The present invention is a roadside safety system and method to communicate to a roadside personnel a potential danger created by an oncoming vehicle. The system includes a projection system that selectively projects a pattern of light in a direction along the roadside, a sensor system that includes a camera to detect the oncoming vehicle, an alert system connected directly or indirectly to the sensor system that selectively causes an alert to notify the roadside personnel when there is the potential danger; and a control system that selectively enables the projection system to project the pattern of light and causes the alert system to issue the alert. The projection system establishes a virtual flare on the road to warn oncoming vehicles of a emergency situation and a processor can process information received by the sensors and can then determine potential threats created by oncoming vehicles.

20 Claims, 12 Drawing Sheets

GAUSSIAN x10 BEAM EXPANDER

SENSOR PROCESSING CHAIN

TRAJECTORY THREAT PROCESSING

SENSOR SUITE TO ROAD CALIBRATION

PROTECTING ROADSIDE PERSONNEL USING A CAMERA AND A PROJECTION SYSTEM

BACKGROUND

The invention relates to the use of virtual flares and automatic detection of potentially dangerous vehicle trajectories to protect roadside personnel, such as police officers, stopped along the roadside and their vehicles. Although directed to police officers, the system of the present invention is useful to protect any person stopped along the roadside.

Personnel on the side of a road, such as police officers at a traffic stop, are endangered by vehicles that stray into the shoulder area. This danger is increased when drivers are distracted or incapacitated. Measures can be taken to get the attention of drivers and divert them from the shoulder area to mitigate the danger by using visual markers such as flares along the edge of the road. However, placing such visual markers takes time and exposes the person placing the markers to potential danger while doing so.

Further, personnel on the side of the road are typically not able to simultaneously perform their assigned task, such as, in the case of a police officer, interacting with a stopped driver, and look behind them to scan for potential vehicular threats. This danger can be made even more serious if the roadside personnel is operating during times of limited visibility, such as at night.

Efforts have been made by others to incorporate lasers as a means of alerting drivers of roadway conditions. Known examples of this include the use of lasers or lights to project markings on the road around bicycle riders. These include the LightLane designed by Altitude Inc. and the Xfire Bike Lane Safety Light, both of which use lasers to project a virtual lane on both sides of a cyclist so that drivers would be more aware of the space the cyclist needs; the BLAZE bicycle light which projects an image on the road a distance in front of the cyclist to alert vehicles ahead of the cyclist that there is a cyclist behind them; and Lumigrids, which projects a grid in front of the cyclist to highlight any dangers, such as potholes, present on or in the roadway.

However, there are no known convenient systems that both diverts oncoming drivers from the area where personnel is exposed to potential danger and alerts personnel to vehicles that pose a potential threat.

SUMMARY OF INVENTION

The present invention is a system and method to provide a roadside safety system to communicate to a roadside personnel a potential danger created by an oncoming vehicle.

In accordance with one aspect of the present invention, a system includes a projection system that selectively projects a pattern of light in a direction along the roadside; a sensor system that includes a camera to detect oncoming vehicles; an alert system connected directly or indirectly to the sensor system that selectively causes an alert to notify the roadside personnel when there is potential danger; and a control system that selectively enables the projection system to project the pattern of light and causes the alert system to issue the alert.

In accordance with another aspect of the present invention, the roadside safety system further comprises a user interface system connected to the control system to allow the roadside personnel to input user preferences.

The alert can be an audio alert, a visual alert, a physical alert, a tactile alert or any combination of these.

In accordance with an aspect of the present invention, a processor in the system determines the trajectory and velocity of oncoming vehicles based on information derived from data from the sensor unit, and the processor processes this information to determine the level of danger. The intensity of the alert is based on the level of danger determined by the processor from this information.

Thus, for example, the alert can be based on the oncoming vehicle's proximity to the pattern of light.

In one embodiment of the invention, the projection system includes lasers and the projection system generates the pattern of light using a laser. The laser generated pattern of light can be a pattern created by bright colors, lines, text, arrows or graphics. Other forms of light projection can also be used.

In one aspect of the invention, the pattern of light is projected on a road. The pattern of light can be projected a pre-programmed set distance away from the roadside safety system. The pattern of light can also be projected a manually set distance away from the roadside safety system. In accordance with another aspect of the invention, the pattern of light is projected a set distance away from the roadside safety system, wherein the roadside safety system automatically determines the set distance based on a geometry and a topography of the road.

In other embodiments of the present invention, the projection system further comprises: a projection control circuit; a laser driver; a laser source; a beam expander; a galvanometer driver, and a mirror galvanometer.

In other embodiments of the present invention, the roadside safety system further comprises a fail-safe interlock system wherein the fail-safe interlock system prevents the projection system from projecting a visible light pattern.

In other embodiments of the present invention, the roadside safety system wherein the sensor system comprises: a sensor control circuit; at least one camera, and a camera digitizer.

In other embodiments of the present invention, the sensor system comprises at least three cameras.

In accordance with an aspect of the present invention, the sensor control circuit detects a headlamp of the oncoming vehicle in a first image taken by the camera; pairs the headlamp from the first image with the headlamp of the oncoming vehicle in a subsequent image taken by the camera, tracks the headlamp in each image, and estimates a trajectory of the oncoming vehicle.

In accordance with an aspect of the present invention, the camera takes a long exposure image and a short exposure image.

DETAILED DESCRIPTION OF THE INVENTION

The invention is intended to protect roadside personnel, such as police officers, stopped along the roadside, as well as their vehicles. Although directed to police officers, the system of the present invention is useful to protect any person stopped along the roadside. This includes, but is not limited to, police officers, utility workers, construction sites, construction workers and emergency vehicles. Roadside personnel could activate a "divert and alert" device as needed to protect themselves from oncoming traffic.

Figure 1:
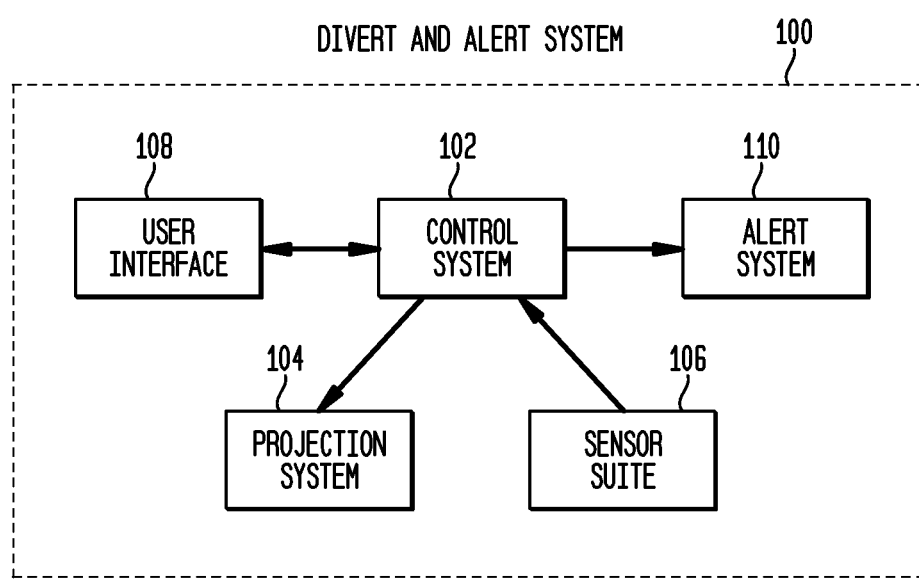
FIG. 1 is a block diagram of an embodiment of a divert and alert system in accordance with an aspect of the invention.

As represented in FIG. 1 and in accordance with one aspect of the present invention, a divert and alert system 100 may comprise a control system 102, a projection system 104, a sensor suite 106, a user interface 108 and an alert system 110. Projection system 104 creates a pattern of lights on a road or other surface by projecting light onto the road surface to create, for example, a virtual "flare line" or "virtual flare." Sensor suite 106 observes oncoming vehicles and a processor processes information from the sensor suite 106 to determine which of the oncoming vehicles, if any, pose a potential threat. The processor may be located in the sensor suite 106, or alternatively, the processor may be located elsewhere, for example in the control system 102. User interface 108 allows roadside personnel to set the system up initially, input information, adjust information, receive information or otherwise interact with the divert and alert system 100. Alert system 110 draws the attention of roadside personnel to a potential threat.

The user interface 108 may be a laptop computer. This laptop computer may also act as the system processor, performing all of the processing activities discussed herein. In this case, data is sent to the laptop computer for processing. Alternatively, the user interface 108 may be a specially designed interface. The user interface 108 may be used to set up the location of the virtual flares or of a line of flares, by reference, for example, to an image from the camera presented on a laptop screen. The user may indicate where they would like "flares" placed, how bright they should be, and how they should appear. The user interface 108 could also be used e.g. to control pan, tilt and zoom of the camera in the sensor suite to compensate for the position and orientation of the vehicle it is mounted on. Other optional uses for the user interface could include sensitivity settings (alarm thresholds). The user interface could also be used to select the alerting method and the calibration of coordinate systems. While the intent is for the system to be as simple to use as possible to use, and to require as little interaction as possible, it should also be flexible enough to allow adjustments in circumstances where they are needed. In one embodiment of the present invention, the projection control system, control of the sensor suite, control of the alerting system (i.e. the control system 102), and the user interface 108 are all embodied in a single laptop computer, which may be in the vehicle, and may even be a computer already provided for other purposes. If a laptop computer is used for the user interface 108, that same laptop computer can perform all of the processor functions. Alternatively, these different functions can be provided by separate electronic or processor sub-systems.

In one embodiment, some or all sub-systems of the divert and alert system 100 are separate from each other. In another embodiment, some or all sub-systems are housed together. In a preferred embodiment, projection system 104 and sensor suite 106 are integrated into a single package to be mounted on a police or emergency vehicle. The vehicle mounting may be removable. In one embodiment of the invention, the projection system 104 is steerable. In one embodiment of the invention, the sensor suite 106 is steerable. The divert and alert system 100 can be affixed to or inside a vehicle, such as an emergency vehicle or a police car, or on or in a separate device carried on the roadside personnel's person or to be set up by the roadside personnel.

Figure 2:
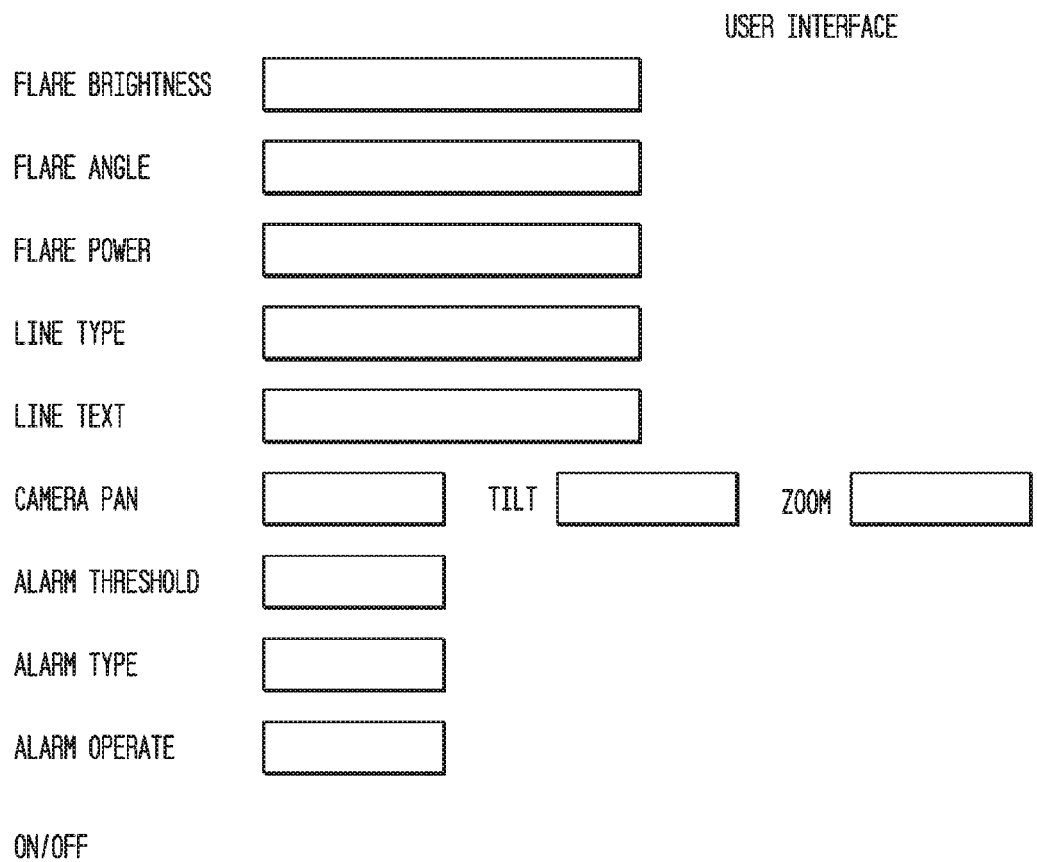
FIG. 2 illustrates a user interface in accordance with an aspect of the present invention.

FIG. 2 illustrates an embodiment of the user interface 108 provided. In FIG. 2, a user can control the brightness of the flare line, the flare angle, the power of a laser or other light generator (to control the distance of the projection of the line), the line type, any line text, the pan, tilt and zoom of any camera in the sensor suit 106, the alarm threshold, the alarm type, the alarm operation and the on/off status of the system. Other embodiments can be used.

Figure 3:
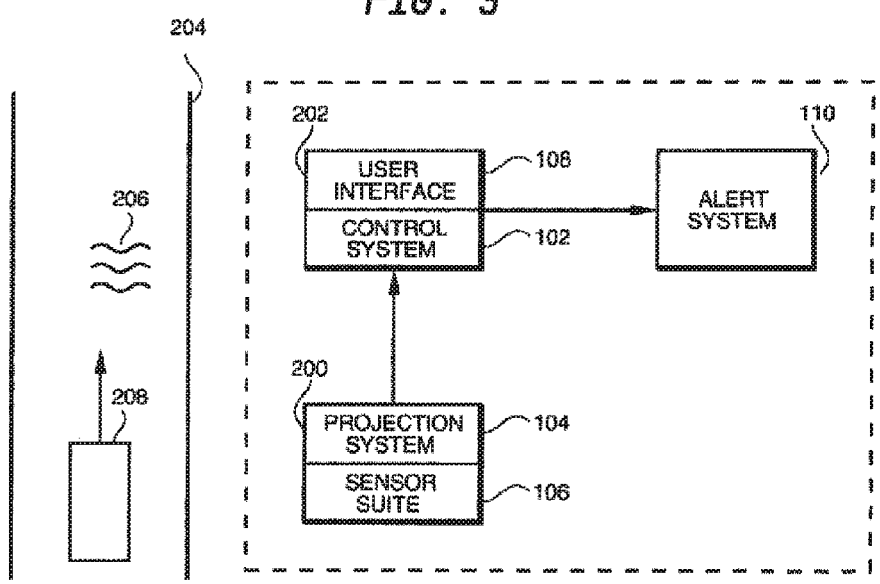
FIGS. 3 and 4 illustrate an embodiment of a divert and alert system of the present invention in operation in accordance with an aspect of the invention.

FIG. 3 illustrates an embodiment of a divert and alert system 100 of the present invention in operation. For this embodiment, the projection system 104 and the sensor suite 106 are housed in a first housing 200. The control system 102 and the user interface 108 are housed in a second housing 202. The alert system 110 is housed in a separate housing. Housing 200 is positioned along a road 204 so as to be able to produce a light pattern 206 at some distance away from housing 200 and on the road 204 using projection system 104 and to be able to detect oncoming vehicle 208 using sensor suit 106. Preferably, the projection system can produce a visible pattern on the road out to a distance of at least 100 or 200 meters and the sensor suite can detect and track oncoming vehicles that may be at least up to double that distance away.

Projection system 104 then generates one or more light patterns 206 on road 204, such that light patterns 206 are visible to an oncoming vehicle 208. When an oncoming vehicle 208 is detected by sensor suite 106, sensor suite 106 processes the information, such as images taken by sensor suite 106, and relays the information back to control system 102. One means of detecting oncoming vehicle 208 occurs when the headlamps of oncoming vehicle 208 are detected by the sensor suite and tracked. The resulting trajectory may be considered dangerous if the vehicle is found to move across the projected light pattern 206, or if it follows a trajectory that will take it across the projected light pattern. Following detection, a processor in the control system 102 (or elsewhere, e.g. in the sensor suite 106 or user interface 108) processes the information and determines the danger associated with the oncoming vehicle 208. If it determines that there is a present danger, control system 102 signals alert system 110 to generate an alert for the roadside personnel.

Figure 4:
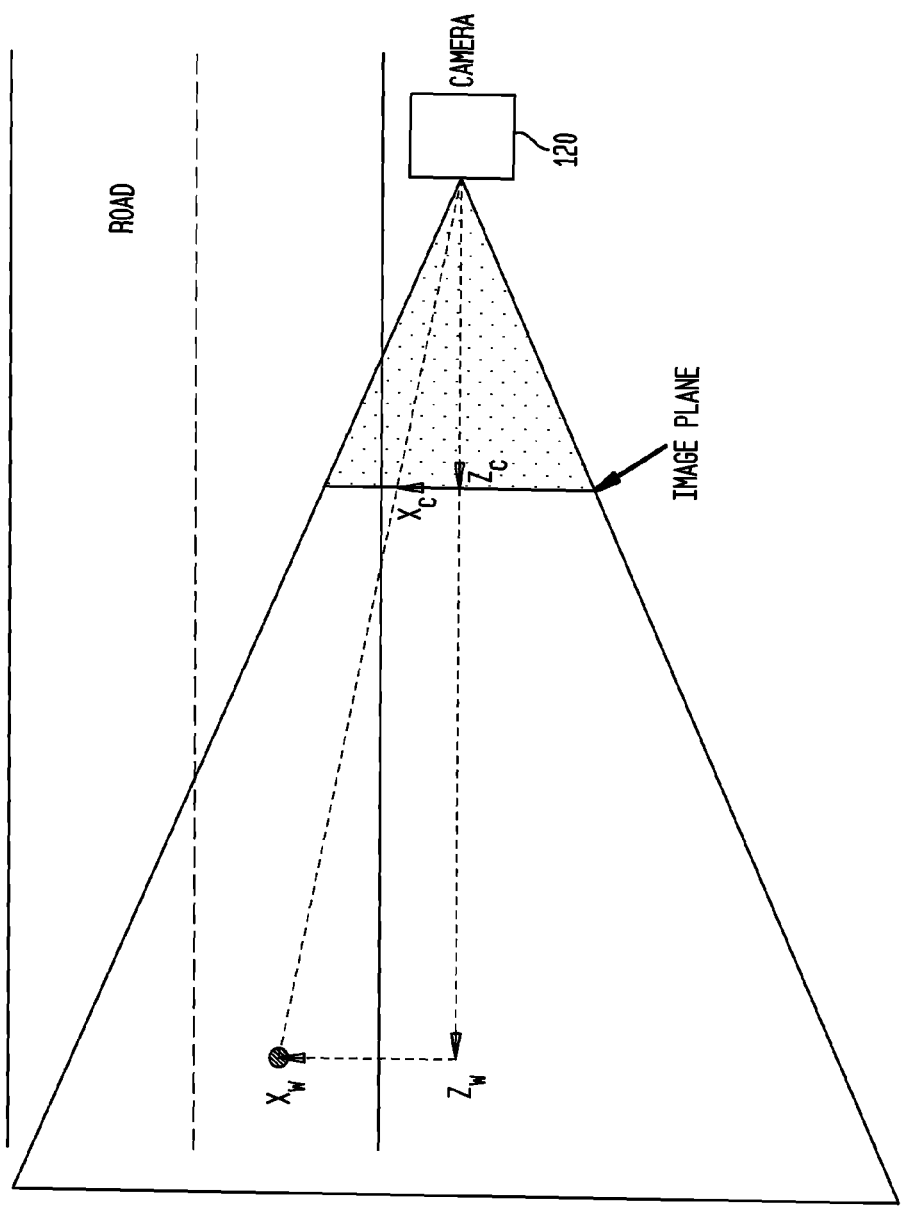

FIG. 4 further illustrates the operation of the present invention in accordance with another aspect of the invention. It shows the shape of the beam from the system of the present invention and it illustrates the beam extending into the roadside.

The methods associated with detecting oncoming vehicle 208 and processing information are explained in further detail below. When a vehicle is detected to be encroaching on the light pattern 206, alert system 108 may alert the roadside personal that a vehicle is approaching and/or make subsequent alerts depending on the present danger of the oncoming vehicle 208. In a preferred embodiment, the alert may be based on the estimated trajectory and velocity of oncoming vehicle 208 in cases where there is an increased probability of collision with personnel or the stopped emergency vehicle. The sensor suite 106 preferably uses a camera 120 (shown in FIG. 4) to detect the image from the image plane. Using image processing techniques, explained later, the sensor suit 106 determines the location, trajectory and speed of oncoming vehicles in the image plane to determine whether an alert should be issued. The sensor suite 106 could optionally also detect the projected light pattern 206 itself (FIG. 3), and detect when oncoming vehicle 208 crosses, or is likely to cross, the projected light pattern 206 and estimate the danger therefrom.

In one embodiment, the alert produced by alert system 110 could be an audio alarm alerting the roadside personnel that they may be in danger and giving them a few seconds to take evasive action. The alert system 110 can vary the audio alarm in amplitude and/or frequency in accordance with the processing of the image by the processor, to indicate the danger level. Thus, the closer a vehicle comes, the processor can cause the alert system 110 alarm to intensify. In another embodiment, the alert could be a visual alarm, such as symbols, colors, text, graphics, lines, arrows, etc. projected by the device on a surface, for example a road, or on the device, for example on the user interface 108. The visual alarm could provide alternate visuals, e.g. colors, that represent different danger levels present and actions to take. For example, a bright red dot would mean immediate danger and a yellow dot would mean potential danger. In yet another embodiment, the alert could be in tactile or haptic form, such as a vibrating device carried on the personnel.

The light patterns, e.g. virtual flares, created by the projection system 102 could take any shape or form, including bright colors, strings simulated as though produced by a flare, warning text, arrow, dotted lines, or other graphics. As shown in FIG. 2, a user can use the user interface 108 to select the line type. The light patterns are preferably displayed on the road surface such that they are visible to oncoming drivers. The light patterns could be stationary on the road in appearance or could appear visually as moving or time varying patterns. The processor, after determining the user interface 108 setting, determines the line type preferred by the user, and conveys this information to the control system 102 which then controls the projection system 104 via known methods to cause the projection system 104 to generate the preferred line types.

Figure 5:
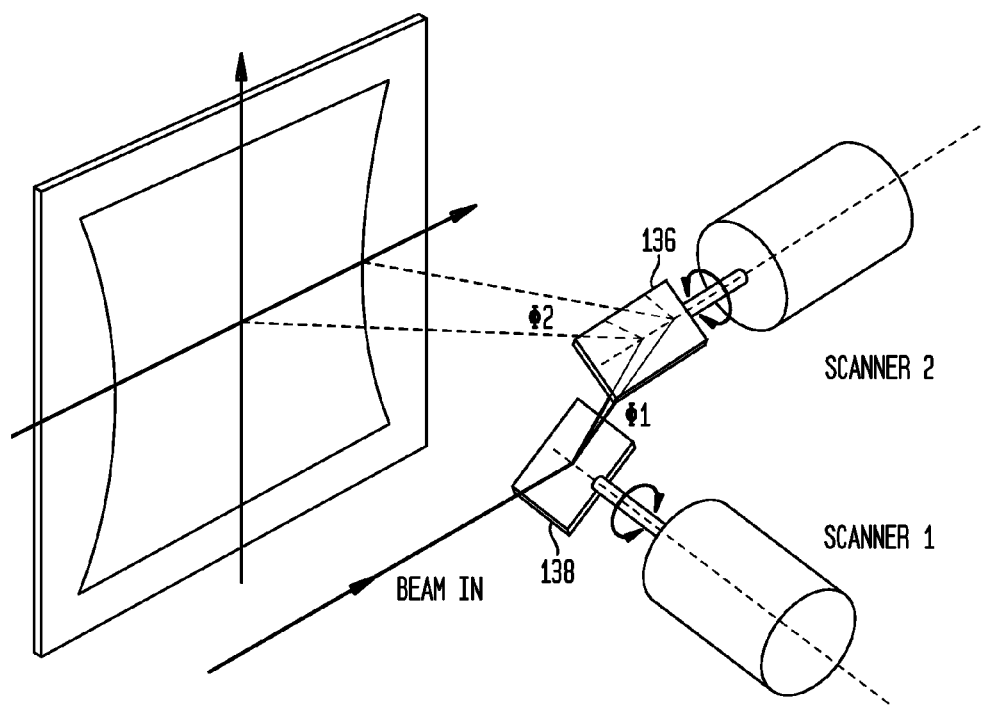
FIGS. 5 and 6 illustrate a standard two mirror galvanometer beam deflection system.

In one embodiment, projection system 104 comprises a deflectable laser beam from, for example, an injection layer diode (ILD) laser, to paint the light pattern on the road surface. A laser is preferred as it will provide sufficient brightness on the road at a preferred distance. The laser beam can be deflected using, for example, two or more galvanometer mirrors, such as galvanometer mirror assemblies available from Thorlabs (such as GVS012 or GVS112) Operation of galvanometer mirrors are well known in the art. With reference now to FIG. 5, as is known in the art, the direction of the exit beam can be controlled by varying the angle of the two mirrors 136 and 138. The direction of the beam then determines which point on the road surface will be illuminated.

Figure 6:
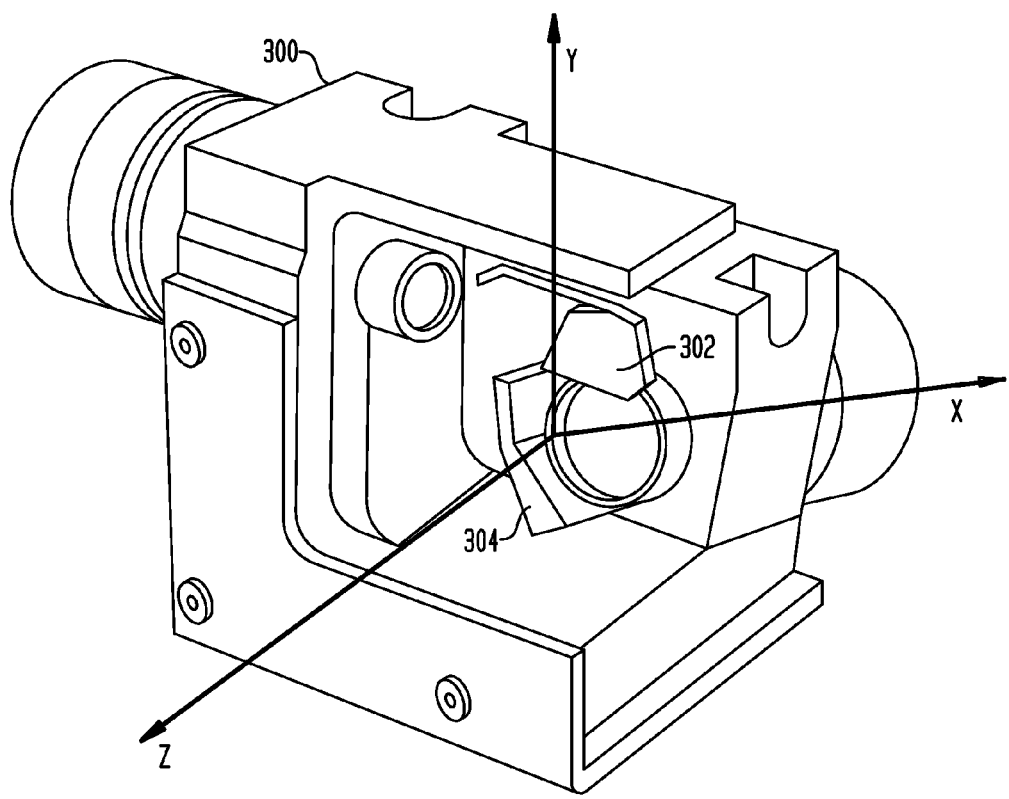

As shown in FIG. 6, the z-axis extends out in the direction of a laser beam that leaves a galvanometer mirror system 300 at zero deflection. The x-axis extends opposite to that of where the laser beam comes into the mirror system 300. The y-axis extends upward, perpendicular to the x and z-axis, forming a right-hand coordinate system. Next, by defining the positive angle of rotation of the galvanometers as clockwise when viewed from a point along the axis on the mirror side of the motor, the deflection of a beam by a mirror can be described as:

$$\hat{b}_{out} = \hat{b}_{in} - 2(\hat{b}_{in} \cdot \hat{n})\hat{n}$$

where $\hat{b}_{in}$ is a unit vector in the direction of the incident beam and $\hat{b}_{out}$ is a unit vector in the direction of the reflected beam and n is the unit normal to the mirror. The axis of rotation of the second, y-axis mirror 300 is $\hat{x}=(1,0,0)^T$. Therefore, the normal to this mirror 300 is $\hat{n}_2=(o, c_2, s_2)^T$, where $c_2=\cos(\theta_2+\theta_{20})$, $s_2=\sin(\theta_2+\theta_{20})$, with $\theta_2$ being the rotation of the axis of that galvanometer from its rest position and $\theta_{20}$ being the rest position angle ($\approx \pi/4$).

The axis of rotation of the first, x-axis mirror 302 is $(o, s_\epsilon, c_\epsilon)^T$ where $c_\epsilon, =\cos(\epsilon)$, $s_\epsilon, =\sin(\epsilon)$, and $\epsilon$ is the angle of inclination of the galvanometer axis with respect to the horizontal plane. The galvanometer in this case, Thorlabs GVS012, measures at $\epsilon \approx 11.5°$. Therefore, the normal to the first mirror is $\hat{n}_1=(s_1, c_1 c_\epsilon, -c_1 s_\epsilon)^T$, where $c_1 =\cos(\theta_1+\theta_{10})$, $s_1=\sin(\theta_1+\theta_{10})$, with $\theta_1$ being the rotation of the axis of that galvanometer from its rest position and $\theta_{10}$ being the rest position angle ($\pi/4$). Of course, other galvanometers can be used.

The beam therefore enters travelling in the negative x-direction, represented by $\hat{b}_0=-\hat{x}=(-1,0,0)^T$. After reflection by the first mirror the beam's direction is $\hat{b}_0 - 2(\hat{b}_0 \cdot \hat{n}_1)\hat{n}_1$. Simplifying further results in:

$$\hat{b}_1 = \begin{pmatrix} C_1 \\ S_1 c_\epsilon \\ S_1 s_\epsilon \end{pmatrix}$$

where $C_1=\cos(2(\theta_1+\theta_{10}))$, $S_1=\sin(2(\theta_1+\theta_{10}))$. After reflection by the second mirror the beam direction is $\hat{b}_1 - 2(\hat{b}_1 \cdot \hat{n}_2)\hat{n}_2$. Simplifying further results in:

$$\hat{b}_2 = \begin{pmatrix} C_1 \\ S_1(-C_2 c_\epsilon + S_2 s_\epsilon) \\ S_1(C_2 s_\epsilon - S_2 c_\epsilon) \end{pmatrix}$$

where $C_2=\cos(2(\theta_2+\theta_{20}))$, $S_2=\sin(2(\theta_2+\theta_{20}))$, or otherwise written:

$$\hat{b}_2 = \begin{pmatrix} C_1 \\ -S_1 C_2' \\ S_1 S_2' \end{pmatrix}$$

where $C_2'=\cos(2(\theta_2+\theta_{20})-\epsilon)$, $S_2'=\sin(2(\theta_2+\theta_{20})-\epsilon$. By making $\theta_{20}=\epsilon/2$ the exit beam will travel parallel to the z-axis when the galvanometers are in their rest position.

By making $\theta_{10}=\pi/2$, $S_1=\cos(2\theta_1)$ and $C_1=-\sin(2\theta_1)$, the result is:

$$\hat{b}_2 = \begin{pmatrix} -\sin(2\theta_1) \\ \cos(2\theta_1)\sin(2\theta_2) \\ \cos(2\theta_1)\cos(2\theta_2) \end{pmatrix}$$

The negative sign on the x-component is in practice taken care of by considering counter-clockwise rotation of galvanometer 1 as positive. Therefore, by projecting the exist beam onto a planar surface perpendicular to the z-axis at distance $f$, the result for calculating the position of the spot is:

$$\begin{pmatrix} x \\ y \\ f \end{pmatrix} = f \begin{pmatrix} -\tan(2\theta_1)\sec(2\theta_2) \\ \tan(2\theta_2) \\ 1 \end{pmatrix}$$

Alternatively, the galvanometer-commanded angles from desired positions in the plane can be calculated using:

$$-2\theta_1 = \operatorname{atan}\left(\frac{x}{\sqrt{f^2 + y^2}}\right)$$

$$2\theta_2 = \operatorname{atan}\left(\frac{y}{f}\right)$$

Using, for example, the above to calculate the position of the spot, the projection system 204 can then be used to generate patterns on the ground. The deflection sequence can be fast enough so that human vision cannot resolve the detailed time sequence and the pattern appears fixed, or, the exposure can be controlled to produce visual effects of motion, such as arrows moving away from the shoulder of the road. These calculations are made by a system processor that can be, for example, located in the projection system 104, the control system 102 or in the user interface 108.

Figure 7:
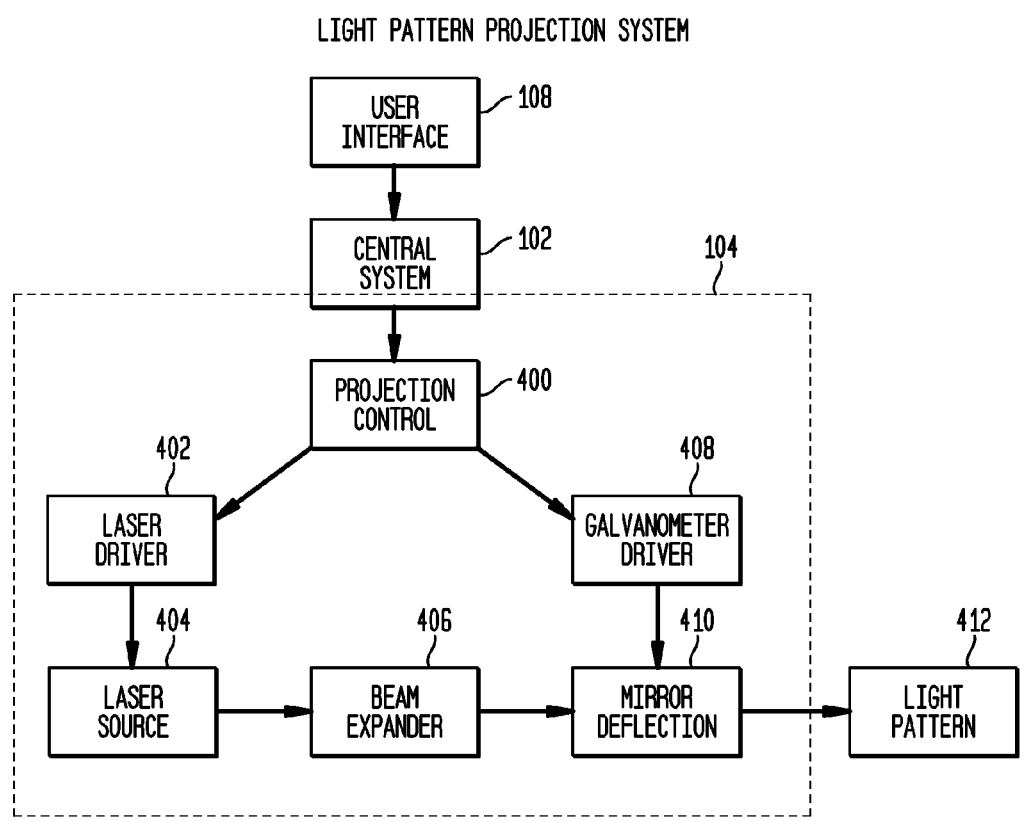
FIG. 7 is a block diagram of an embodiment of a projection system in accordance with an aspect of the invention.
Figure 8:
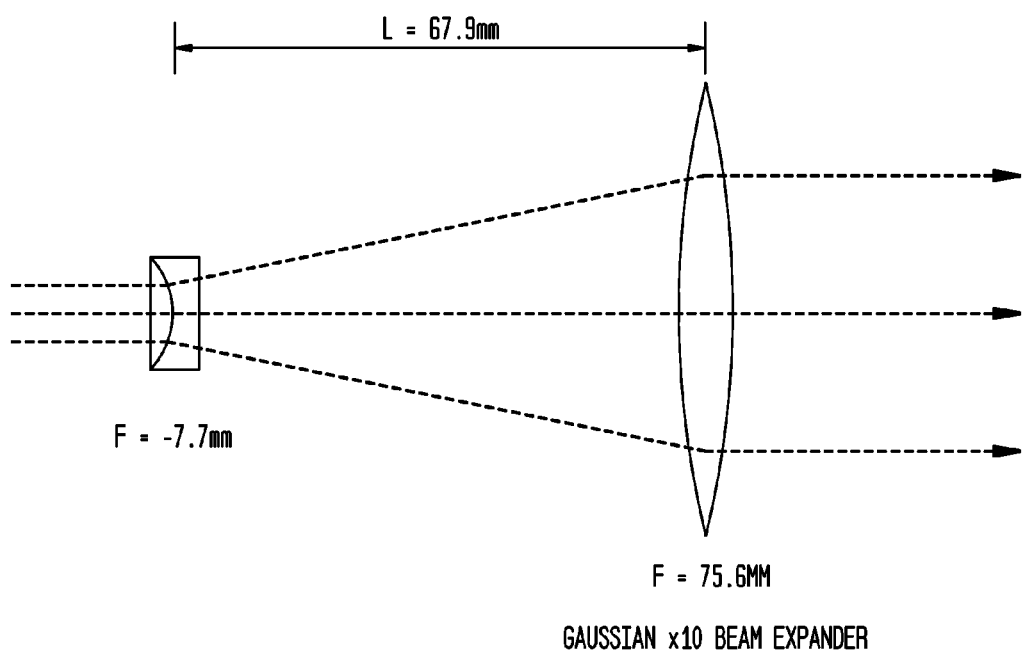
FIG. 8 illustrates a Guassian Beam Expander.

As shown in FIG. 7, in one embodiment of one aspect of the invention, projection system 104 may comprise a projection control 400, coupled to user interface 106, connected to a laser driver 402 and galvanometer driver 408. Laser driver 402 produces a current, which may be pulse-width-modulated (PWM), that can be coupled to a laser source 404 which produces a laser beam. Although a laser is used to describe this embodiment, it is well known in the art that there are other equivalent high-intensity light sources which may be used. The laser produced by laser source 404 may go through a beam expander 406, as shown in FIG. 8. The expanded beam may then hit a mirror 410, such as a galvanometer mirror, driven by a galvanometer driver 408 to produce the desired light display or pattern 412. The laser driver controls the laser current and the duration during which the laser is on. The brightness of the beam can be controlled by changing the current, and/or, in "pulse width modulated" (PWM) mode by changing the "duty factor" (fraction of time that the current is on). The projection control system 400 directs the detailed operation of the laser and mirror deflection system and is responsible for safety interlocks. The projection control system receives commands from the control system 102 that describe the pattern to be painted on the road surface and its position.

The resulting light display 412 may be pre-programmed in the projection control or galvanometer driver or a general purpose computer connected to the projection system 104, such as control system 102 and user interface 108. Alternatively, the pattern or light display may be selected and positioned by the personnel using the system to suit their local circumstances using projection control 200, control system 102 or user interface 106. Alternatively, in the interest of more automatic operation, and less work load on the personnel, the sensor suite 106 may determine the geometry and topography of the road and automatically select suitable light patterns 412 and their placement in relationship to the vehicle or construction site. The sensor suite 106 may, for example, determine the linear features of the road such as lane markings and road edges and use them to determine the relative orientation of the camera by means of by means of vanishing points, as described below. The processor described earlier can perform all of these functions. Once having determined the relationship between the vehicle that the system is mounted on, and the road, a suitable warning pattern, such as a line of flares, may be selected and positioned relative to the known road geometry.

One embodiment of the present invention uses a bright, preferentially red, laser as laser source 404 and two computer controlled galvanometer mirrors 410 to deflect the beam rapidly to a number of pre-programmed positions. Human vision is more sensitive to green light than red, so a green laser is more visible for the same power, or conversely, needs less power for the same visual effect. However, green is typically used to indicate something other than danger. An alternative embodiment may use a yellow laser, or a mix of red and green laser outputs as a compromise that needs less power or conversely is more visible for the same output power. This choice also reduces the eye safety concerns discussed below.

The laser should have a low divergence so that the spot on the road surface remains relatively small even at larger distances away. Since there is a well-known tradeoff between beam diameter and beam divergence, the beam divergence may be reduced by first expanding the beam using well known optical techniques, for example an inverted telescope, and beam expander 406. One can use the Galilean telescope of FIG. 8 to accomplish this. The mirrors 410 of the galvanometers should be large enough so that they encompass the full beam size. Small mirrors can more easily and quickly be rotated via drivers 408 resulting in a speed of "writing" the light patterns on the road greater than with using larger mirrors. Larger mirrors have higher inertia, and so they cannot be moved as rapidly as similar smaller mirrors. As a result there is a trade-off between beam divergence and the speed of "writing" the light pattern on the road. Although the embodiment was described with respect to galvanometer drivers, the present invention is not so limited and functional equivalents, as are well known in the art, may be used.

Because the beam impinges on the road at a shallow angle, the shape of its "footprint" on the road will be elongated in the direction towards the source of the light, thus creating a fore-shortening effect. That is, the illuminated spot on the road surface is stretched out considerably in the direction of the road, and this may suggest that the amount of detail that can be presented in the pattern is limited by this "blurring" or "smearing" effect. At large distances, this elongation can be significant, since the angle between the beam and the road surface becomes quite small. Fortunately the driver of an oncoming vehicle is also looking at the spot of light on the road from a shallow angle and so this elongation is not as noticeable. In fact, the distortion due to foreshortening will be cancelled out when the driver happens to be at about the same distance from the spot above a flat road as the laser source is (and at about the same height above the road). There are advantages to at least partially compensating for the foreshortening effect so as to make the instantaneous projected spot appear as small as possible. The pattern drawn then will be less affected by the "blurring" or "smearing" due to the enlarged spot size, and so can contain finer detail, such as arrowheads and text. One way to do this is to change the cross-section of the laser beam from approximately circular to elliptical, with the short axis of the ellipse vertical. This can be done using well known means, such as cylindrical lenses.

It is well known that the brightness of the projected beam on a road surface, in terms of power per unit area, will drop off with distance; however, ignoring atmospheric absorption, the total power in a spot remains relatively constant. Regardless, it may be advantageous to use somewhat more average power when "painting" more distant parts of the light pattern so that the pattern is clearly visible when the driver of an oncoming vehicle first notices it. This can be achieved either by modulating the power of the laser, by changing the dwell time for a spot, by changing the sweep speed for extended patterns, or any other methods well-known to one of ordinary skill in the art.

Another aspect of the present invention includes safety features. Should the deflection system fail, then all the power from the laser source 404 could be concentrated in one spot. This concentration may pose a threat to the vision of an observer viewing the spot from the opposite direction. Therefore another aspect of the invention includes a fail-safe interlock system. In one embodiment, the fail-safe interlock system can cut the light when the deflection system, e.g. the galvanometer driver 408 and mirror deflection 410, fails. This can be done by the processor by shutting the power to the laser, or interposing a shutter, when it is detected that the deflection mirrors have remained in any one position for more than a short time. Failure can be detected by sensing the position feedback from the galvanometers (which is already used by the galvanometer control system). If that signal is not changing for more than the exposure time of one dot in the pattern, then the laser power is shut off. In another embodiment, the fail-safe mechanism could also shut the projection system 104 down when it aims the beam outside a designated area on the road as the result of mechanical or electronic failure, or when, for example, the beam is raised above the local horizon level. This type of failure can also be detected using the position feedback of the galvanometers. This signal is already used by the galvanometer control system, and if it is not changing for more than the exposure time of one dot in the patter, then the laser power is shut off.

In another embodiment of the present invention, the invention includes, either in addition to the safety features described above or as a separate safety feature, a safety feature for preventing excessive exposure of the laser source 404 to personnel near the laser source 404. In particular, it could be dangerous to stare into the projection system 104 from a point near it. One such safety system could use the sensor suite 106 to detect entry of a person into the zone illuminated by the light source. When an object is interposed between the light projection system and the road, an extremely bright spot or pattern will appear in the camera image, which can be detected and used to shut down the laser system. Another such safety system could simply measure the overall light reflected back towards the light source using a single light detector. Under such a system, if sensor suite 106 detects entry by a roadside personnel or other object into the projection system's 104 light path, i.e. part of that light is reflected back to the sensor, it may shut down projection system 104. Other safety mechanisms may include means, such as passive infrared detectors, for detecting nearby moving, warm objects, such as personnel. The laser system should also not be used when the vehicle is moving, or when the enclosure it is mounted in is moving relative to the vehicle. Simple accelerometers (such as MEMS devices used in smartphones) can be used to detect movement (such as the box containing the equipment moving unexpectedly) and shut down the power to the laser.

Further embodiments for projecting controlled light patterns on the road may include bright light sources with spatial light modulators (SLM), digital light modulators (DLM), or micro electro-mechanical systems (MEMS) driving arrays of small mirrors. Although the embodiments above were described with respect to galvanometer drivers and mirrors, the present invention is not so limited and functional equivalents, as are well known in the art, may be used.

Figure 9:
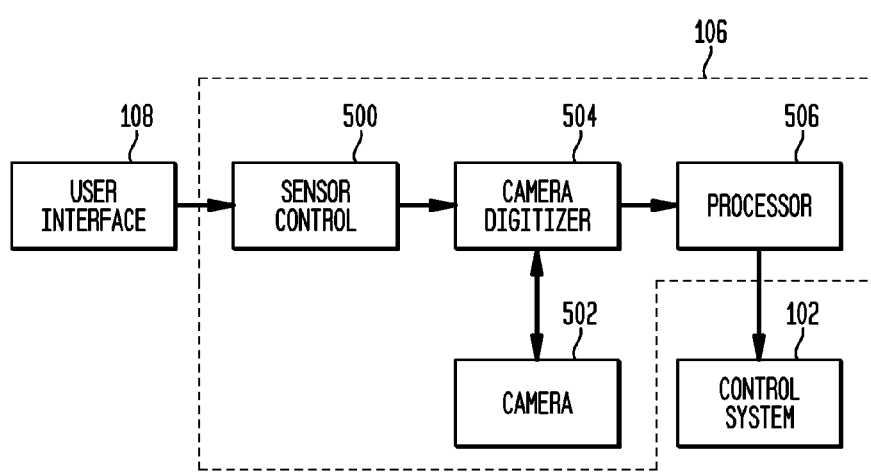
FIG. 9 is a block diagram of an embodiment of a sensor suit system in accordance with an aspect of the invention.
Figure 10:
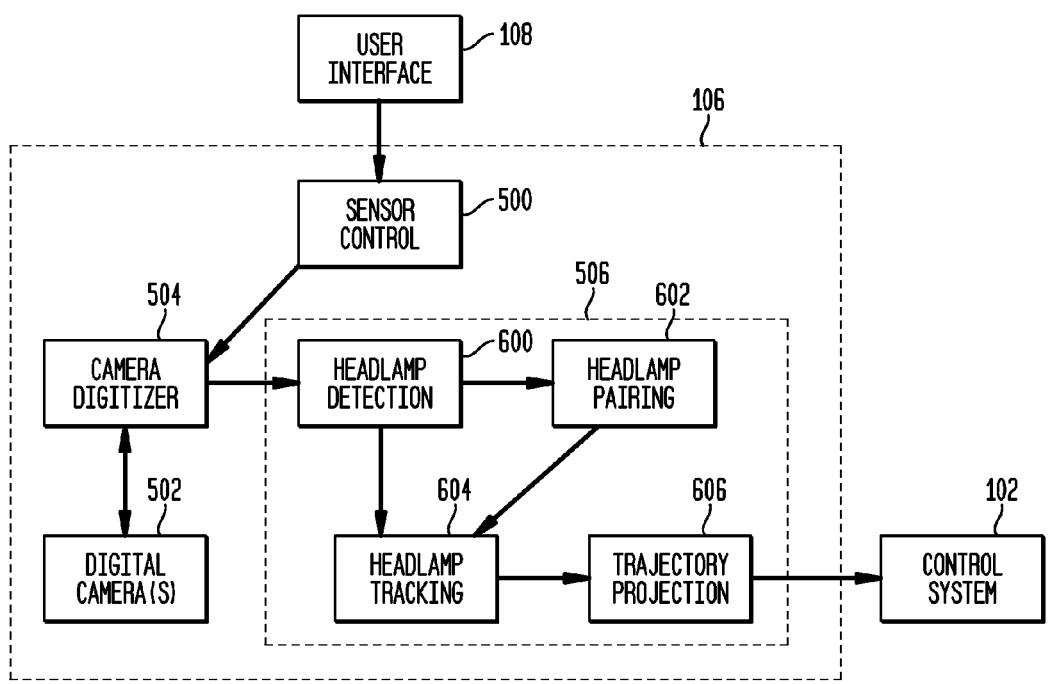
FIG. 10 is a block diagram of the process performed by a processor on data collected by a sensor suit system in accordance with an aspect of the invention.

FIG. 9 illustrates an aspect of the present invention in light of an embodiment of a sensor suite 106. Sensory suite 106 may comprise a sensor control 500 which controls a camera digitizer 504 and a camera 502 which captures images of oncoming vehicles, and a processor 506. Now with reference to FIG. 10, in one embodiment sensor suite 106, camera 502 captures images of incoming vehicles. Those images are processed through the camera digitizer 504 and are fed to processor 506. As described in further detail below, processor 506 begins by detecting the headlamps of incoming vehicles at 600. Processor 506 then pairs the headlamps from each image of the oncoming vehicle at 602. The processor then processes the headlamp detection 600 and headlamp pairing 602 information and begins tracking the headlamps from image to image at 604. The processor uses the tracking 604 information to project a trajectory of the oncoming vehicle at 606. The trajectory projection 606 is then transmitted to control system 102. As described above, in one aspect of the invention, if control system 102 determines that the oncoming vehicle presents a danger, it will activate alert system 110 to warn the roadside personnel. In alternate embodiments, roadside personnel may use user interface 108 to set the boundaries and elements analyzed by sensory suit 106.

One means of determining whether an oncoming vehicle's given trajectory 606 poses a threat is to calculate its spatial position relative to that of a light pattern 206 projected by projection system 104 or the stopped vehicle. Such spatial relationship may be needed to determine, for example, when a vehicle's predicted trajectory 606 will intersect the light pattern 206. A calibration step, described in further detail below, during the setup of the equipment can use images of projected light spots to determine the relationship between the coordinate systems of the sensor suite and that of the light projecting system. This calibration may be done once when the system is first assembled, or may be repeated whenever it is used. The calibration may be manually assisted or fully automatic.

The three-dimensional trajectory 606 of the vehicle can be estimated from monocular image positions of vehicles when assumptions, described below, are made about typical vehicle dimensions. In another embodiment, two cameras 502 are used to provide binocular stereo information which can be used to determine three-dimensional trajectories 606 without the need for assumptions about dimensions of vehicles. In this case, the disparity between the two camera images provides direct information about distance. In yet another variation, three cameras 502 can be used in a "trinocular stereo" system, which trades off increased component complexity against reduced image processing computational demands.

One embodiment of the sensor suite 106 uses a monocular imaging arrangement, where images of headlamps are detected and tracked using video from a single camera 502. Detection can be based on known binary image processing algorithms after thresholding the grey-level image from the camera to obtain a binary image. These detection processes are described in chapters 3 and 4 of "Robot Vision" (1986) by Berthold K. P. Horn, which are hereby incorporated by reference. The threshold used can be fixed, or can be determined automatically from the image brightness histogram, for example. This can provide for adaptation to changing lighting levels.

A headlamp image may contain a region of connected pixels that are above threshold, otherwise referred to as a "blob" in binary image processing. Morphological operations can be used to remove isolated noise spots from the image. The area, perimeter, shape, and position of each blob can be determined. More accurate determinations of such parameters can be taken by reference back to the original grey-level image. Some parameters, such as a centroid, can be obtained more accurately by also referring back to the original grey-level image, by for example, computing the centroid of the grey-level image in the area outlined by a blob in the binary image.

The centroids of bright blobs can be tracked from image to image. In a set of images with relatively little motion, one means of tracking a particular blob is to locate the blob in a new image that is closest to the position of the blob in the previous image. Once the image motion from image frame to image frame is be estimated, that motion estimate can be used to predict where a blob should appear in the next image. That predicted location can then be used in further tracking This allows robust tracking even when the blob moves several pixels per frame time interval.

Another aspect of a sensor suite 106 monocular imaging arrangement, i.e. single camera, embodiment may include, in addition to tracking a blob, calculating the distance of a vehicle based on additional parameters. Such parameters may include the known size of objects or the known separation between objects. One such object may be a vehicle's headlamps. Dimensional references related to the headlamps could be the height of the headlamp above the road or and/or the separation between a vehicle's headlamps. The use of these cues, alone or in combination, allows the determination of a full three dimensional trajectory for a headlamp or a pair of headlamps from a monocular image sequence.

This method of calculating distance requires the use of an overall scale factor that depends on the actual headlamp size, the actual height above the ground of the headlamp, or the actual separation between headlamps. Since these quantities are not standardized, one cannot be entirely sure about the scale of the three dimensional trajectory based on any one of them. However, there are additional sources of information. For example, the trajectory of the vehicle obviously cannot be below the surface of the road. This provides a powerful constraint on the scale factor, since a scale factor that would result in a trajectory that was partially under the road would obviously not be valid. Further, the determination of whether a trajectory is potentially dangerous can be performed even in the presence of some uncertainty in exact distances from the sensor. This is because a trajectory is likely to be potentially dangerous independent of whether it intersects an imaginary "red line" at 50 meters or at 60 meters, for example.-Of these three scaling dimensions, the headlamp separation is the largest and likely to provide the most reliable information.

Using headlamp separation as a scaling dimension requires associating corresponding headlamp images from image to image. One means of doing this is to compare the area of two image "blobs", their height in the image (assuming the camera is orientated such that the horizon is more or less parallel to rows of pixels in the image), their image brightness (although misadjusted headlamps may sometimes not match well in brightness) and their image color (although often the camera exposure, in order to "see" distant vehicles, is adjusted in such a way that nearby headlamps will saturate the camera sensor and so "wash out" color information).

When many image blobs are detected, there may be ambiguity in how they should be matched up in pairs, even when following the above criteria. In this case, well-known methods for pairwise matching can achieve the "best" pairing according to a defined criterion based on how well members of a pair match, as well as other factors such as the total number of pairs matched. Such optimization methods perform a search to find the pair-wise matching that maximizes some defined criterion, such as the sum of measures of how well individual headlamp image pairs match, minus some multiple of the number of unmatched headlamp images remaining after the pairing operation.

Once two blobs have been paired, they can be more easily tracked through future images. When far away, however, headlamp images may be so close together that they appear as one "blob." In tracking far-away blobs, it is acceptable to have a single blob being tracked split into a pair of blobs. Fortunately, when the vehicle is still far away, small errors in position are not significant to the safety of the roadside personnel.

Additionally, real scenes have a large dynamic range, and some cameras cannot capture that full range accurately. Consequently, there is a trade-off in exposure setting: a long exposure will saturate images of nearby headlamps; a short exposure will underexpose distant headlamps. Accordingly, it may be advantageous to work with both a short and a long exposure image. This can be accomplished using a single camera. However, this can also be accomplished using two co-located cameras, one set to short exposure and one set to long exposure. The two images can then be combined into a single of higher dynamic range. Each camera, may, for example, produce images with 8-bit grey-values which could then be combined into a 16-bit grey-value. Alternatively, the image taken with longer exposure could be used for the upper part of the resulting image, likely to contain images of distant vehicles, while the image taken with shorted exposure could be used for the lower part, where images of nearby vehicles will appear.

There may be at least one problem associated with using headlamp separation as a scaling dimension. Specifically, when traffic density is high, some headlamps may be obscured, at least for some periods while in the field of view, thereby making it difficult to calculate a scaling dimension. This is less of a problem if both headlamps were visible earlier at some point in time to establish the scaling factor. In very heavy traffic it may happen that one headlamp is obscured most of the time and then the other cues to correct scaling may need to be resorted to. One means of avoiding this problem all together is to calculate the distances between corresponding image features in two images taken with cameras in slightly different positions. One method of doing this, as encompassed in an alternate embodiment of the sensor suite 106, is to use two cameras 502: i.e. a binocular stereo system.

The correspondence problem is a computationally expensive one in general, but here it is simplified by the type of images under consideration (namely a set of headlamp images). Using two properly calibrated pairs of cameras produces two images; therefore an image of a point in one image can correspond only to points on a known line in the other camera's image. There are well-known methods in the field of machine vision for solving both the binocular stereo correspondence problem and that of determining the three dimensional positions of imaged points from stereo matches. These methods are described in chapter 13 of "Robot Vision" (1986) by Berthold K. P. Horn, which is hereby incorporated by reference.

One disadvantage of a binocular system is that there is the need for calibration between the two cameras. Specifically, the so-called "relative orientation" of the two cameras must be determined, i.e. the "base line" between them, and the relative rotation of one camera relative to the other must also be determined). One means of determining the relative orientation is to use a calibration object of known dimensions viewed by both cameras. This means is further discussed and explained in detail below. In the case here, a substitute for the calibration object can be bright reference points imposed by the accompanying projection system 104 in controlled positions that both cameras can see. The previously mentioned processor can perform these steps. These steps are discussed in greater detail in Chapter 13 of Robot Vision (1986) by Berthold K. P. Horn, which is incorporated by reference. See the photogrammetric methods described in Chapter 13.

Figure 12:
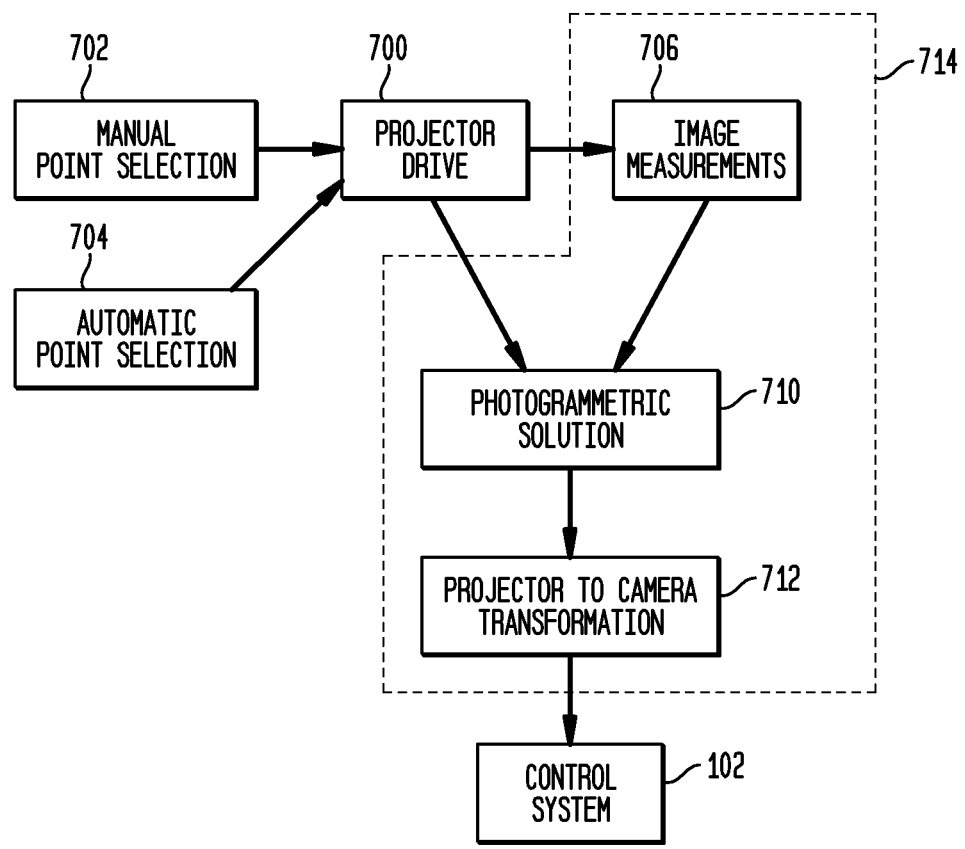
FIG. 12 is a block diagram of an embodiment of a light source to sensor suite calibration in accordance with an aspect of the invention.

Referring to FIG. 12, a calibration process is illustrated. The pattern points are selected either manually 702 by the roadside personnel or automatically 704. Projection system 104 generates at least three reference patterns (such as bright spots) for cameras 502 to capture (either sequentially or simultaneously). The imaging system detects the position of the image of each pattern. From a number of such measured relationships between light projector position and camera image positions, the coordinate transformation between the two systems can be ascertained (as taught by Chapter 13 of Robot Vision. The photogrammetric solution 710 then calculates the projector to camera transformation 712. Control system 102 can then use this transformation to relate headlamp positions in the images to parts of the projected pattern and, for example, determine when a vehicle trajectory is likely to intersect a boundary defined in terms of the projected pattern.

Alternatively, projection system 104 need not produce the bright points; instead, other objects in cameras' 502 images may be used. However, this substitute for a calibration object is not quite ideal, since the points will tend to lie more or less in a plane (the road surface), and it is known that photogrammetric algorithms, such as relative orientation, do not perform as well when data points all lie in a plane or close to a plane. Regardless, the results are typically accurate enough to be useful.

Calibration of the two cameras 502 can be done either automatically each time the system is used, or may be initiated manually. Preferably, however, the system would be automatic to ensure more accurate operation and reduce the work load on the personnel.

While a binocular machine vision system has clear advantages in terms of more accurate distance estimates, it also has some additional costs as a result of the extensive calculations required. The cost of image processing in solving the correspondence problem can be dramatically reduced if three cameras are used. This is because a potential match between headlamp images in two of the cameras can immediately and easily be verified or rejected by looking in a defined position in the third image. For example, the match is not valid if there is no headlamp image in the predicted position in the third image. Of course, this convenience, and reduction in computational load, comes at the cost of three cameras and the infra-structure needed to support and calibrate them. Accordingly, as represented in the preferred embodiment, the monocular system is the most cost-effective and provides sufficient accuracy. However, advances in technology may make other systems more viable, and thus the invention is not limited as such.

In one embodiment, the divert and alert system must relate positions known in the coordinate system used by the sensor suite 106 to positions in the coordinates used by the projector system 104, and vice versa. One method of doing this includes determining the relative orientation, i.e. the translation and rotation, between the two Cartesian coordinate systems. The problem of determining the relationship between two coordinate systems using image measurements is well known in the photogrammetry and machine vision art, and is explained in detail, for example, in Horn, B. K. P. "Relative Orientation Revisited," Journal of the Optical Society of America, A, October 1991, Vol. 8, pp. 1630-1638, found at http://people.csail.mit.edu/bkph/papers/Relative_Orientation_Revisited.pdf, and Horn, B. K. P. "Relative Orientation," International Journal of Computer Vision Vol. 4, No. 1, pp. 59-78, January 1990, found at http://people.csail.mit.edu/bkph/papers/Relative_Orientation.pdf, both incorporated herein by reference.

One method of calculating the coordinate transformation between the two systems is to detect bright spots produced by the system and perform a calibration step, as, for example, described above in reference to FIG. 12. One method of calculating the transformation between the projection system 104 coordinate system and the sensor suite 106 coordinate system starts with a representation of the sensor suite's 106 projection equations as:

$$\frac{x_i}{f} = \frac{X_c}{Y_c}$$

and $$\frac{y_i}{f} = \frac{Y_c}{Y_c}$$

where $(x_i, y_i)$ are the coordinates of the image of the point $(X_c, Y_c, Z_c)^T$ measured in the sensor suite's 106 coordinate system. The transformation between some word coordinate system $X_w$, $X_w$ and $X_w$ is given by a rotation and a translation $$\begin{pmatrix} X_c \\ Y_c \\ Z_c \end{pmatrix} = R \begin{pmatrix} X_w \\ Y_w \\ Z_w \end{pmatrix} + t$$

where R is an orthonormal rotation matrix and $t=(X_0, Y_0, Z_0)^T$ is the translation offset.

When dealing with a plane, such as the road surface, it is possible to erect the world coordinate system such that $Z_w=0$ for points on that surface. Accordingly $$X_c = r_{11}X_w + r_{12}Y_w + X_0$$

$$Y_c = r_{21}X_w + r_{22}Y_w + Y_0$$

$$Z_c = r_{31}X_w + r_{32}Y_w + Z_0$$

where $r_{11}$, etc. are the components of the rotation matrix. It can therefore be represented as $$\begin{pmatrix} X_c \\ Y_c \\ Z_c \end{pmatrix} = \begin{pmatrix} r_{11} & r_{12} & X_0 \\ r_{21} & r_{22} & Y_0 \\ r_{31} & r_{32} & Z_0 \end{pmatrix} \begin{pmatrix} X_w \\ Y_w \\ 1 \end{pmatrix}$$

Using the perspective projection equation, it can be concluded that $$k \begin{pmatrix} x_i \\ y_i \\ f \end{pmatrix} = \begin{pmatrix} X_c \\ Y_c \\ Z_c \end{pmatrix}$$

where $k=(Z_c/f)$. Consequently, $$k\begin{pmatrix} x_i \\ y_i \\ f \end{pmatrix} = \begin{pmatrix} r_{11} & r_{12} & X_0 \\ r_{21} & r_{22} & Y_0 \\ r_{31} & r_{32} & Z_0 \end{pmatrix} \begin{pmatrix} X_w \\ Y_w \\ 1 \end{pmatrix}$$

or $$kf\begin{pmatrix} x_i \\ y_i \\ 1 \end{pmatrix} = \begin{pmatrix} fr_{11} & fr_{12} & fX_0 \\ fr_{21} & fr_{22} & fY_0 \\ r_{31} & r_{32} & Z_0 \end{pmatrix} \begin{pmatrix} X_w \\ Y_w \\ 1 \end{pmatrix}$$

or $$k_i \begin{pmatrix} x_i \\ y_i \\ 1 \end{pmatrix} = M_c \begin{pmatrix} X_w \\ Y_w \\ 1 \end{pmatrix}$$

Accordingly, it can be seen that there is a linear relationship between homogeneous coordinates on the world plane, e.g. road surface, and homogeneous coordinates in the image plane.

With regards to the laser, it can be assumed that there is a plane a distance f front of the device and specify the direction of rays from it by coordinates $x_l$ and $y_l$ where the ray intersects this plane. Therefore, a similar relationship between coordinates in this plane and coordinates on the road will result:

$$k_l \begin{pmatrix} x_l \\ y_l \\ 1 \end{pmatrix} = M_l \begin{pmatrix} X_w \\ Y_w \\ 1 \end{pmatrix}$$

Combining the two transformations to find a transformation between laser coordinates and image coordinates results in:

$$k\begin{pmatrix} x_i \\ y_i \\ 1 \end{pmatrix} = M\begin{pmatrix} x_l \\ y_l \\ 1 \end{pmatrix}$$

where $M = M_l M_c^{-1}$.

The calibration task, therefore, is that of finding M, a 3×3 matrix, using correspondences between laser coordinates ($x_l$, $y_l$) and image coordinates ($x_i$, $y_i$). The matrix M has 9 elements, but because it relates homogeneous coordinates, its magnitude is irrelevant. Consequently, there are only 8 unknown elements; after fixing one component, such as $m_{33}=1$, one can solve for the rest. Accordingly $$kx_i = M_1 \cdot (x_l, y_l, 1)^T$$

$$ky_i = M_2 \cdot (x_l, y_l, 1)^T$$

$$k_i = M_3 \cdot (x_l, y_l, 1)^T$$

where $M_1$, $M_2$, and $M_3$ are the three rows of the matrix M and the dot denotes dot product. Using the last equation to substitute for k in the first two equations results in:

$$m_{11}x_l + m_{12}y_l + m_{13} - m_{31}x_l x_i - m_{32}x_i y_l - m_{33}x_i = 0$$

$$m_{21}x_l + m_{22}y_l + m_{23} - m_{31}y_i x_l - m_{32}y_i y_l - m_{33}y_i = 0$$

Accordingly, this results in two such linear equations in the unknown elements of the Matrix M for every correspondence between a laser direction ($x_l$, $y_l$) and the coordinates of the image ($x_i$, $y_i$) of a spot that the projection system 104 makes on the surface, e.g. road. Collecting sufficient correspondences and applying the non-homogenous equation $m_{33}=1$ allows the system to solve the resulting set of linear equations for the components of the transformation matrix M.

Alternatively, if the projection system 104 and sensor suite 106 are rigidly mounted to one another, then this calibration can be done at the factory. However, small changes in dimensions over time, due to, for example, temperature changes and mechanical jarring, may lead to the need for re-calibration in the field. This can be done manually or automatically, using the means described above and any other known methods.

In one embodiment, the projection system 104 and sensor suite 106 can be mounted on a vehicle. This includes, but is not limited to, the roof of a vehicle. In alternate embodiments, the system can be affixed at roadside construction sites, such as on a high pole. The advantages to mounting the projector and sensor suite at a higher altitude include less concern with interception of the radiation by personnel, less concern with interception by objects, a better vantage point to produce a laser pattern and capture images, and the ability to determine the trajectories of vehicles more accurately when projected onto the road surface. However, in alternate embodiments, the system can be mounted at lower altitudes.

One question that arises is where to mount the projector and sensor suite, and in particular, whether they should be close together or far apart. In practice there are limitations due to the need to mount the equipment on a vehicle. So even though there are advantages to mounting the sensors very high, the most practical position will be the roof of the vehicle (for a more permanent installation, such as at a roadside construction site, cameras could be mounted on a high pole). Similarly, while mounting the light projector high up would have advantages, such as less concern with interception of the radiation by personnel, the light projector most likely would be mounted on the roof of the vehicle also.

Further, in other embodiments, the projection system 104 and sensor suite 106 can be mounted at separate locations from one another. Alternatively, they can be mounted relatively close to one another. In the preferred embodiment, the projection system 104 and sensor suite 106 are mounted together in one box. This has two advantages: one is that the above mentioned calibration of projection and sensor coordinate systems will not likely have to be repeated since the projection system 104 and sensor suite 106 can be rigidly mounted to one another. The other is that, to a good degree of approximation, the translation between the two coordinate systems is very small and can be ignored and so calibration only needs to recover the relative rotation, as opposed to the translation as well. A method known as "absolute orientation" can be used for this purpose. This method is described in Horn, B. K. P., "*Closed-Form Solution of Absolute Orientation using Unit Quaternions,*" *Journal of the Optical Society A*, Vol. 4, No. 4, pp. 629-642, April 1987, which is hereby incorporated by reference.

In alternate embodiments, the above described systems could use a coordinate system aligned with the road. This coordinate system can be useful as it can determine what point in the image corresponds to what point on the road. The potential danger of a given trajectory can be best accessed in relation to known lane markers and road edges. Accordingly, it is particularly instructive to convert trajectories known in the camera coordinate system to trajectories in the road coordinate system.

Camera calibration can be used to relate these coordinate systems using well known methods from photogrammetry and machine vision. As disclosed in chapter 13 of "Robot Vision" by Berthold K. P. Horn, which is incorporated by reference, as well as in the above mentioned references to "relative orientation" and to "absolute orientation"), herein incorporated by reference, one such method calculates a common point, known as the "vanishing point" in perspective projection, through which image lines, as captured in the camera image, pass through. Using the vanishing point, it is possible to estimate the orientation of the camera relative to the road and calibrate accordingly. The image lines include, but are not limited to, lane markings, center lines, and edge lines which project into slanted image lines, and the horizon, if visible, which projects into a "horizontal line" in the image. The position of the vanishing point, where these lines intersect, can be used to recover two of the three parameters of orientation of the camera. The third can be fixed by making sure that the camera is level. Alternatively, the angle of the line of the image of the horizon can be used to recover the third parameter.

Figure 13:
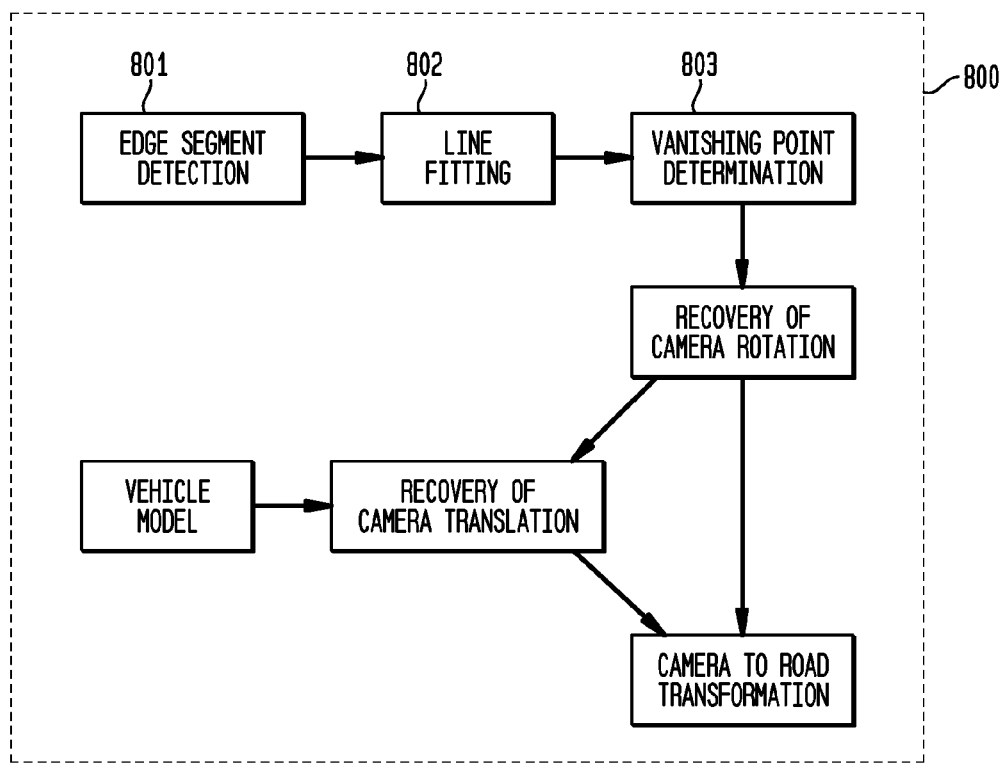
FIG. 13 is a block diagram of an embodiment of a sensor suite to road calibration in accordance with an aspect of the invention.

FIG. 13 illustrates an embodiment one aspect of the present invention in regards to using the vanishing point as a sensor suite 106 to road calibration.

In FIG. 13, edge fragments 801 are detected and lines fitted 802, as described in chapter 8 of "Robot Vision". The intersection of these lines is then estimated using a simple least-squares procedure or the Hough transform (described in U.S. Pat. No. 3,069,654 which is hereby incorporated by reference). The pan and tilt of the camera can then be computed from the position of the vanishing point in the image. The known size of the vehicle and the mounting position of the system on the vehicle can be used to determine the height of the camera above the road surface. Together, the translational offset and the rotation constitute the transformation between the sensor suite and the road. This can be used to convert trajectories known in the sensor suite coordinate system to trajectories in the road coordinate system.

In one embodiment, the vanishing point is found manually in images 803. In another embodiment, the vanishing point is found automatically by finding the intersection of lines in the image. Line fragments can be extracted using well known machine vision methods. These can be aggregated and used to populate a Hough transform array.

One means of calculating the vanishing point and performing and making appropriate calibrations therefrom begins with assuming that $(X_w, Y_w, Z_w)^T$ are "world coordinates" aligned with the road. The $Z_w$-axis is parallel to the road increasing in the direction the sensor suite 104 camera is aimed, the $Y_w$-axis is parallel to the gravity vector increasing in the downward direction, and the $X_w$-axis is orthogonal to the other two increasing in the right direction when facing in the positive $Z_w$ direction. For convenience, assume that the origin of this coordinate system coincides with the center of projection (COP) of the camera.

Further assume that $(X_c, Y_c, Z_c)_T$ is the "camera coordinates" $Z_c$ aligned with the optical axis, $X_c$ is horizontal to the right, and $Y_c$ is vertical down. The origin of this coordinate system is also at the center of projection. Therefore, the perspective mage projection can be represented as $$\frac{x}{f} = \frac{X_c}{Y_c}$$

$$\frac{y}{f} = \frac{Y_c}{Z_c}$$

where f is the focal length and (x, y) is the position in the image, measured relative to the principal point, i.e. image center. The camera from the sensor suite 104 is mounted such that it permits yaw θ about the Y axis, and pitch φ about the X axis. Accordingly, there is a relationship between the world coordinate system and the camera coordinate system $$\begin{pmatrix} X_c \\ Y_c \\ Z_c \end{pmatrix} = R \begin{pmatrix} X_w \\ Y_w \\ Z_w \end{pmatrix}$$

where $$R = \begin{pmatrix} 1 & 0 & 0 \\ 0 & \cos\varphi & \sin\varphi \\ 0 & -\sin\varphi & \cos\varphi \end{pmatrix} \begin{pmatrix} \cos\theta & 0 & \sin\theta \\ 0 & 1 & 0 \\ -\sin\theta & 0 & \cos\theta \end{pmatrix}$$

or $$R = \begin{pmatrix} \cos\theta & 0 & \sin\theta \\ -\sin\theta\sin\varphi & \cos\varphi & \cos\theta\sin\varphi \\ -\sin\theta\cos\varphi & -\sin\varphi & \cos\theta\cos\varphi \end{pmatrix}$$

The vanishing point $(x_v, y_v)$ of the road can thus found by projecting the rotated $(0,0,Z_w)^T$ to obtain:

$$\frac{x_v}{f} = \tan\theta\sec\varphi \qquad \frac{y_v}{f} = \tan\varphi$$

From this, to estimate how far a line parallel to $Z_w$ lies from the camera, the first assumption to make is that the line passes a distance w to the right of the COP and a distance h below it. This road line projects into a line in the image. Points on the line have coordinates $(w,h,Z)^T$. Thus:

$$\frac{x_c - x_v}{f} = \frac{X_c}{Y_c} - \tan\theta\sec\varphi = \frac{X_c\cos\theta\cos\varphi - Z_c\sin\theta}{Z_c\cos\theta\cos\varphi}$$

and $$\frac{y_c - y_v}{f} = \frac{Y_c}{Z_c} - \tan\varphi = \frac{Y_c\cos\varphi - Z_c\sin\varphi}{Z_c\cos\varphi}$$

where $X_c = w\cos\theta + Z\sin\theta$ $Y_c = -w\sin\theta\sin\varphi + h\cos\varphi + Z\cos\theta\sin\varphi$ $Z_c = -w\sin\theta\cos\varphi - h\sin\varphi + Z\cos\theta\cos\varphi$ After some simplification, the results are:

$Y_c \cos\phi - Z_c \sin\phi = h$ $X_c \cos\theta \cos\phi - Z_c \sin\theta = w \cos\phi + h \sin\theta \sin\phi$ Consequently, $$\frac{x_c - x_v}{y_c - y_v} = \frac{w\cos\varphi + h\sin\theta\sin\varphi}{h\cos\theta}$$

represents the tangent of the angle between the projection of the line and the vertical in the image.

Accordingly, $$\tan\xi = \frac{w}{h}\frac{\cos\varphi}{\cos\theta} + \tan\theta\sin\varphi$$

Therefore, it is possible to calculate w/h from the angle ξ of the projected line and the known camera orientation parameters θ and φ, resulting in $$\frac{w}{h} = \tan\xi \frac{\cos\theta}{\cos\varphi} - \tan\varphi \sin\theta$$

From the above equation then, if the height h of the COP above the road surface is known, it is possible to estimate the horizontal offset w of the line from the camera. If this is done for an additional two lines, e.g. lane markings, then it is possible to estimate the distance between them. Conversely, if the distance between the two lines is already known, then it is possible to calibrate for h if it is not known.

If the camera exposure is set to image headlamps, the background will be more or less invisible (mostly black). So such images cannot be used for this calibration. However, the same camera could be set to take longer exposures even if just during this calibration step. Alternatively, a camera that deals with high dynamic range using double, or even triple, exposures of different durations, as mentioned above, could be used for both calibration and imaging for headlamp tracking purposes.

Figure 11:
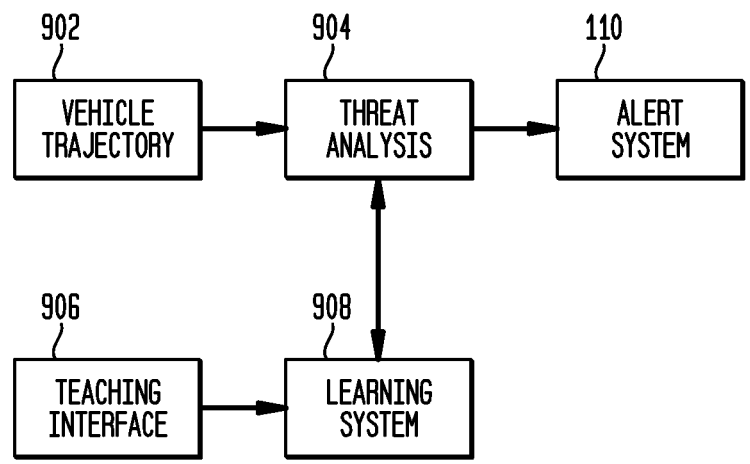
FIG. 11 is a block diagram of an embodiment of a trajectory threat processing in accordance with an aspect of the invention.

With reference to FIG. 11 now, the divert and alert system ultimately functions to alert roadside personnel of incoming danger. As explained above, sensory suite 106 engages in predicting a vehicle trajectory 902. The vehicle trajectory is fed into a processor 904 (the processor mentioned earlier) that performs a threat analysis. The threat analysis may be entirely pre-programmed or may automatically adapt to trajectories actually observed once the system is started by the personnel. The threat detection may be fine-tuned by "teaching" it which trajectories are threatening and which are not through a teaching interface 906 and a learning interface 908. This is something that would be done ahead of time by driving past the stationary system along both "good" and "bad" trajectories. Well known methods of machine learning would then be used to adjust the thresholds and other criteria used by the threat analysis system. The resulting threat analysis then signals the alert system 110 to provide the appropriate alert. In the simplest case, threat analysis would determine whether a trajectory intersects, or is likely in future to intersect, a line of virtual flares, or other "red line," selected by the personnel using the user interface 101. This is an example of a preprogrammed threat analysis strategy.

The alert sent to the personnel in potential danger could be through an audible signal from the vehicle, using an existing transducer such as the horn or a siren. It can also be sent directly to a communicator already being carried by the personnel for other purposes, or even their cell phone. The audible signal could be modulated in amplitude or frequency according to the level of threat or estimated "time to contact."

Visible warnings are also possible using either equipment already available on the vehicle, such as headlamps and flashing warning lights, or lights on equipment worn by the personnel. Haptic feedback is another possibility: the communicator or cell phone could vibrate to announce a threat. The amplitude or frequency of vibration could vary with the level of threat.

Figure 14:
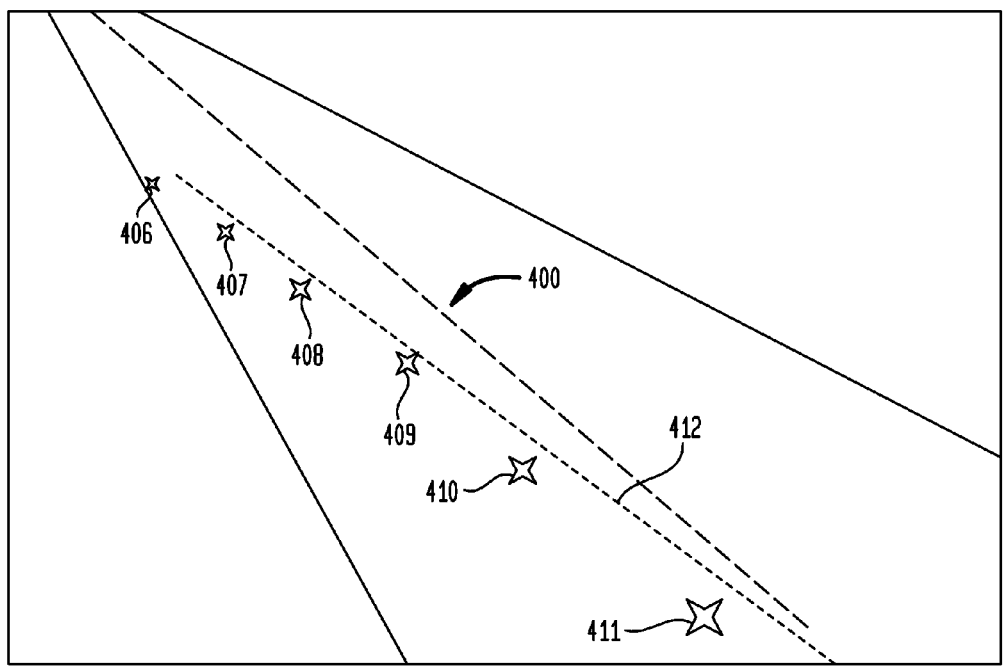
FIG. 14 illustrates an image displayed on the user interface that is based on data received by the sensor system.

Referring to FIG. 14, a typical camera image with extra graphics superimposed is illustrated. This image can be, for example, shown on a laptop computer 108 which may be used to implement the user interface 108. This is the image obtained by the camera in the sensor suit, along with some superimposed graphical elements.

The dashed black 400 line is the center line of the two-lane road, whose edges are indicated by the two solid diagonal lines 402 and 404. The star shapes 406 to 411 are virtual flares generated by the projection system 104 that are positioned on top of the image, either automatically, or by user interaction, using mouse or touchscreen for positioning. The dashed line 412 is a sample "red line" that, when crossed by a vehicle, will initiate an alarm. This "red line" or curve can be placed by the personnel also using the user interface.

While the alerting can be based on more sophisticated threat analysis, as indicated n the specification, in the simplest case it could be based on just determining whether, in the image, a vehicle crosses the "red line". In a preferred implementation, however, a processor, such as in the user interface 108, performs coordinate transformations to project the trajectory back into world/road coordinates allows a more accurate determination of real threat level.

The processor can then determine a safe zone outside the red line 412. So for example, the processor performs the coordinate transformations of oncoming vehicle locations and then determines vehicle position, trajectory and velocity from those positions, using known techniques. Since the processor also knows the road coordinates of the red line 412, it can determine when a vehicle crosses the red line and cause an alert to issue when the red line 412 is crossed. Alternatively, the processor can process the vehicle speed and direction to project a time when the red line 412 would be crossed, assuming the vehicle continued on its travels, and sound an alarm when the processor projects the vehicle would cross the red zone. In another embodiment, the processor can determine if an oncoming vehicle is traveling over a certain speed and sound an alarm. So, for example, if a vehicle is travelling over 75 miles per hour, an alert could be issued. In another embodiment, the user can enter the speed limit of the road and if a vehicle is traveling a certain speed over the speed limit (which can also be entered by the user), then an alarm would be issued by the system.

In accordance with an aspect of the present invention, a method is provided to provide roadside safety. In accordance with the method, a user sets up a projection system, as previously described, to project light, which may be a laser light pattern, along a roadside. The user can, in one embodiment of the method, control the laser light pattern through a user interface that controls the projection system. The user can control the strength of the light to control the distance the light is projected and can also control the type of pattern that is projected. For example, text can be projected. The user can also control alerts, that are provided by the system in the manner previously described, when one or more oncoming vehicles create a dangerous situation.

Oncoming vehicles are monitored with a sensor system. The sensor system may, for example, be one or more cameras, as previously described. The sensor system processes the camera images, which typically show images of oncoming vehicles and causes one or more images to be displayed on the user interface of the system. The location of the pattern of light on the roadside provided by the projection system can also be determined by a processor based on the location of the presentation system and based on the characteristics of the selected projected light. The light or the pattern of light projected by the projection system can be superimposed on the displayed images by the user interface.

The system can cause an alarm to go off when an oncoming vehicle creates a dangerous situation. The dangerous situation can be determined to occur when an oncoming vehicle crosses the light or the pattern of light described above. The alarm can also go off in any of the other circumstances described before.

While the description above refers to particular embodiments of the present invention, it will be understood that many modifications may be made without departing from the spirit of the invention thereof. Nothing in the description should be interpreted as a limitation on the accompanying claims. The scope of the invention is indicated by the appended claims, rather than the foregoing description, and all changes which come within the meaning and range of equivalency of the claims are therefore intended to be embraced therein.

We claim:

1. A roadside safety system to communicate to a roadside personnel a potential danger created by an oncoming vehicle, comprising:
   a projection system that selectively projects a pattern of light in a direction along the roadside;
   a sensor system that includes a camera to detect the oncoming vehicle;
   an alert system connected directly or indirectly to the sensor system that selectively causes an alert to notify the roadside personnel when there is the potential danger created by the oncoming vehicle; and
   a control system that selectively enables the projection system to project the pattern of light and causes the alert system to issue the alert.

2. The roadside safety system as claimed in claim 1 further comprising a user interface system connected to the control system to allow the roadside personnel to input user preferences.

3. The roadside safety system as claimed in claim 1, wherein the alert is an audio alert.

4. The roadside safety system as claimed in claim 1, wherein the alert is a visual alert.

5. The roadside safety system as claimed in claim 1, wherein the alert is a physical alert.

6. The roadside safety system as claimed in claim 1, wherein the alert is a combination of alerts comprising an audio alert, a visual alert or a physical alert.

7. The roadside safety system as claimed in claim 1, wherein the alert is based on a trajectory and an estimated velocity of the oncoming vehicle.

8. The roadside safety system as claimed in claim 1, wherein the alert is based on the oncoming vehicle's proximity to the pattern of light.

9. The roadside safety system as claimed in claim 1, wherein the projection system generates the pattern of light using a laser.

10. The roadside safety system as claimed in claim 1, wherein the pattern of light is a pattern created by bright colors, lines, text, arrows or graphics.

11. The roadside safety system as claimed in claim 1, wherein the pattern of light is projected on a road.

12. The roadside safety system as claimed in claim 11, wherein the pattern of light is projected a pre-programmed set distance away from the roadside safety system.

13. The roadside safety system as claimed in claim 11, wherein the pattern of light is projected a manually set distance away from the roadside safety system.

14. The roadside safety system as claimed in claim 11, wherein the pattern of light is projected a set distance away from the roadside safety system, wherein the roadside safety system automatically determines the set distance based on a geometry and a topography of the road.

15. The roadside safety system as claimed in claim 1, wherein the projection system further comprises
   a projection control circuit,
   a laser driver,
   a laser source,
   a beam expander,
   a galvanometer driver, and
   a mirror galvanometer.

16. The roadside safety system as claimed in claim 1, further comprising a fail-safe interlock system wherein the fail-safe interlock system prevents the projection system from projecting a visible light pattern.

17. The roadside safety system as claimed in claim 1 wherein the sensor system comprises
   a sensor control circuit,
   at least one camera, and
   a camera digitizer.

18. The roadside safety system as claimed in claim 17, wherein the sensor system comprises at least three cameras.

19. The roadside safety system as claimed in claim 17, wherein the sensor control circuit
   detects a headlamp of the oncoming vehicle in a first image taken by the camera,
   pairs the headlamp from the first image with the headlamp of the oncoming vehicle in a subsequent image taken by the camera,
   tracks the headlamp in each image, and
   estimates a trajectory of the oncoming vehicle.

20. The roadside safety system as claimed in claim 17, wherein the camera takes a long exposure image and a short exposure image.

* * * * *